(12) United States Patent
Young

(10) Patent No.: US 7,396,047 B1
(45) Date of Patent: Jul. 8, 2008

(54) RIDE-ON TURF MOWING MACHINE ROLLOVER PROTECTION ASSEMBLY

(75) Inventor: Rick K. Young, McPherson, KS (US)

(73) Assignee: Femco, Inc., McPherson, KS (US)

( * ) Notice: Subject to any disclaimer, the term of this patent is extended or adjusted under 35 U.S.C. 154(b) by 464 days.

(21) Appl. No.: 10/891,239

(22) Filed: Jul. 14, 2004

(51) Int. Cl.
*B60R 21/13* (2006.01)

(52) U.S. Cl. .................................................. 280/756

(58) Field of Classification Search ................ 280/756; 296/190.3, 205, 102; 180/900
See application file for complete search history.

(56) References Cited

U.S. PATENT DOCUMENTS

| | | | | |
|---|---|---|---|---|
| 3,353,852 | A * | 11/1967 | Wood | 403/189 |
| 3,455,598 | A * | 7/1969 | Tweedy et al. | 296/102 |
| 3,612,581 | A | 10/1971 | Frankenberg | |
| 3,656,803 | A | 4/1972 | Brown et al. | |
| 3,733,103 | A | 5/1973 | Hansen | |
| 3,754,315 | A * | 8/1973 | Heitman | 29/401.1 |
| 4,049,294 | A | 9/1977 | Atherton | |
| 4,135,756 | A | 1/1979 | Hausmann | |
| 4,136,985 | A * | 1/1979 | Taul | 403/172 |
| 4,158,460 | A | 6/1979 | White | |
| 4,565,402 | A * | 1/1986 | Hopkins | 296/3 |
| 4,877,265 | A | 10/1989 | DeBraal et al. | |
| 4,949,991 | A | 8/1990 | Ludwig | |
| 5,042,835 | A | 8/1991 | Burns | |
| 5,503,430 | A | 4/1996 | Miki et al. | |
| 5,779,272 | A | 7/1998 | Panek et al. | |
| 5,839,758 | A | 11/1998 | Finch et al. | |
| 6,059,351 | A | 5/2000 | Ehnes | |
| 6,202,394 | B1 | 3/2001 | Russ | |
| 6,237,952 | B1 | 5/2001 | Burckhartzmeyer et al. | |
| 6,511,088 | B2 * | 1/2003 | Kahlstorf | 280/415.1 |
| 6,517,111 | B2 | 2/2003 | Mizuta | |
| 6,662,983 | B2 * | 12/2003 | Lane et al. | 224/405 |
| 6,749,039 | B1 * | 6/2004 | Uphaus | 180/357 |
| 2003/0009920 | A1 * | 1/2003 | Aoki et al. | 37/468 |
| 2004/0112667 | A1 * | 6/2004 | Minoura et al. | 180/308 |
| 2005/0156422 | A1 * | 7/2005 | Della Valle | 280/756 |
| 2005/0168007 | A1 * | 8/2005 | Westendorf et al. | 296/102 |

OTHER PUBLICATIONS

Author: John Deere Worldwide Commercial and Consumer Equipment Division; Title: *Technical Manual*; Item Title: *F1145 Front Mower*; Date: Sep. 1, 1996; p. 9-41; Volume-Issue Number: Unknown; Publisher: Unknown; Country: U.S.A.

* cited by examiner

*Primary Examiner*—Eric Culbreth
*Assistant Examiner*—Joseph Rocca
(74) *Attorney, Agent, or Firm*—Mark E. Brown

(57) ABSTRACT

A ride-on turf mowing machine rollover protection assembly consisting of a mower chassis having left and right main rails and having a plurality of cross rails spanning between the left and right main rails; left and right upwardly opening quills; a first plurality of welds rigidly interconnecting the left main rail and the left upwardly opening quill; a second plurality of welds rigidly interconnecting the right main rail and the right upwardly opening quill; a roll bar having left and right legs, each leg having a lower end, the lower ends of the left and right legs being respectively closely fitted for nesting extension into the left and right upwardly opening quills; and a plurality of helically threaded bolt, nut, and double shear eye combinations removably mounting the lower ends of the left and right legs of the roll bar within the left and right upwardly opening quills.

6 Claims, 4 Drawing Sheets

RIDE-ON TURF MOWING MACHINE ROLLOVER PROTECTION ASSEMBLY

FIELD OF THE INVENTION

This invention relates to residential and commercial lawn tractors, garden tractors, front mower deck ride-on mowing machines, mid-mower deck ride-on mowing machines and zero turning radius (Z.T.R.) ride-on mowing machines. More particularly, this invention relates to apparatus and assemblies whose function is protection of riders and operators of such vehicles from injury due to rollover.

BACKGROUND OF THE INVENTION

Residential and commercial lawn tractors, garden tractors, front mower deck ride-on mowing machines, mid-mower deck ride-on mowing machines and zero turning radius (Z.T.R.) ride-on mowing machines (referred to below generally as ride-on turf mowing machines) are commonly shipped, stored, and operated in environments which varyingly give rise to desirability and a lack of desirability of mounting of an operator protecting roll bar. Where an operator of a ride-on-mower is secured upon the machine by a seat belt, and where the machine topples or rolls laterally, a roll bar installed thereon must extend upwardly overhead to an elevation sufficient to prevent an impact of the operator's head against the ground. Such ground contact may catastrophically fracture the operator's skull or neck. Accordingly, such roll bars typically extend approximately four feet above the operator's seat. Such upward roll bar extensions undesirably block compact stacked storage and shipping of ride-on turf mowing machines, giving rise to desirability of temporary removal of such roll bars during storage or shipping. Where a ride-on mower is operated exclusively upon substantially level ground surfaces, cost economies may be obtained by foregoing provision and mounting of such a roll bar, or by removing and interchanging such roll bar for use upon an alternate ride-on mower which is operated upon sloped ground surfaces.

Commonly, operator protecting roll bars are fixedly welded to frame members or chassis members of ride-on mowers. Directly welded attachments of roll bars advantageously provide structural rigidity and security against roll bar failure in the event of a rollover event. However, such welded attachments undesirably interfere with and prevent removal and interchangeability of roll bars for purposes of compact shipment and storage, or for achieving cost economies as described above.

The instant invention solves or ameliorates problems set forth above by providing a roll bar chassis mount assembly which efficiently, mechanically simply, and with cost economy alternately rigidly attaches a roll bar upon a ride-on turf mowing machine and permits detachment for roll bar removal.

BRIEF SUMMARY OF THE INVENTION

A first structural component of the instant inventive ride-on turf mowing machine rollover protection assembly comprises a chassis, preferably having paired left and right and longitudinally extending main rails. A plurality of cross rails or braces span between and rigidly interconnect the left and right main rails, the main rails and cross rails combination preferably forming a rigid "ladder frame" weldment. The mower's mowing deck, engine, wheels, drive train, body, and steering assemblies are typically supported by the chassis in addition to the components of the inventive assembly.

Further structural components of the instant inventive assembly comprise left and right upwardly opening quills. Preferably, hollow bores or channels of the quills extend substantially vertically. Also preferably, the left and right quills further respectively open leftwardly and rightwardly and are configured as "C" channel beams, preferably comprising steel. The left and right quills are preferably attached by fixed attaching means to inner surfaces of the left and right main rails of the mower's chassis, a preferred fixed attaching means comprising metal fusing welds. The upwardly opening channels which extend through the left and right quills preferably have square or rectangular horizontal cross sectional profiles, the inner peripheries of the channels preferably being closely fitted to horizontal cross sectional profiles of roll bar legs.

Suitably, the left and right quills may be alternately configured as circular cylinders or sleeves, their outer surfaces preferably being fixedly welded to opposing left and right surfaces of the mower's chassis. Utilization of quills which include such circular cylindrical configuration assumes a corresponding circular roll bar leg configuration.

Where a turf mower's chassis provides deficient welding surfaces for secure quill attachment, the left and right quills may suitably additionally comprise angled laterally extending gusset plates which may provide additional rigid triangulating support to the quills and provide additional welding surfaces.

The means for fixedly attaching the left and right quills to the chassis may suitably alternately comprise helically threaded bolt, nut, and apertured mounting flange combinations facilitating bolted attachments of the quills to the chassis. Alternately, apertured mounting flange and rivet combinations may be utilized. Also suitably, helically threaded clamping brackets, "U" bolts and the like interconnecting the quills and chassis may be alternately utilized. Further alternately, wholly formed joints integrating the quills and the chassis may be utilized.

A further structural component of the instant inventive mower rollover protection assembly preferably comprises a square tube, rectangular tube, or round tube roll bar having left and right downwardly extending legs. Preferably, the horizontal cross sectional profiles of the lower ends of the roll bar's left and right legs are closely fitted for nesting downward extensions into the left and right upwardly opening quills' channels.

In a mowing machine rollover event, engagement of the machine's attached roll bar with the ground desirably commences at or prior to the completion of 90° of roll. Such early roll event ground contact lessens the possibility of occurrence of a "bell clapper" type head/ground impact at the 90° roll point. In order to achieve such early roll bar ground contact, the upper end of the roll bar preferably has a substantially wider lateral dimension than the operator's shoulder span. However, in many circumstances, the lateral spacing between the left and right main rails of a mowing machine's chassis is little more than an operator's shoulder width. In such circumstances, the upper end of such roll bar is preferably widened substantially for early ground contact and, to accommodate the width of the chassis, the left and right legs are preferably inwardly canted.

The instant inventive assembly necessarily incorporates roll bar removable attaching means. Such means preferably comprise alignable double shear eyes forming substantially horizontally and longitudinally extending channels through the quills and through the lower ends of the legs. Upon alignment, such eyes preferably receive helically threaded bolts which are secured by matching helically threaded nuts. Suitably, the roll bar removable attaching means may alternately comprise helically threaded screw and threaded eye combinations, or shear pin and double shear eye combinations. Also suitably, quick release spring biased lug and alignable eye combinations may be provided. Also suitably, the roll bar attaching means may alternately comprise overlying slide stops integral with the roll bar's legs in combination with underlying threadedly attached feet or snap collar and channel combinations, such overlying and underlying structures vertically capturing and removably mounting the lower ends of the legs of the roll bar within the quills' channels.

In use of the instant inventive assembly, the quill attaching means in combination with the roll bar attaching means securely and rigidly mount a roll bar upon a ride-on mowing machine's chassis for protection of an operator during a rollover event. In the event that it becomes desirable to remove or interchange the roll bar, the roll bar attaching means are conveniently manually manipulated for disengagement, removal, and if necessary, subsequent replacement of the roll bar.

Accordingly, it is an object of the instant invention to provide a ride-on turf mowing machine rollover protection assembly which facilitates secure and rigid removable mounting of a roll bar upon a turf mower's chassis.

Other and further objects, benefits, and advantages of the present invention have been set forth and described above, and further appear in the Detailed Description which follows.

DETAILED DESCRIPTION OF A PREFERRED EMBODIMENT

Figure 1:
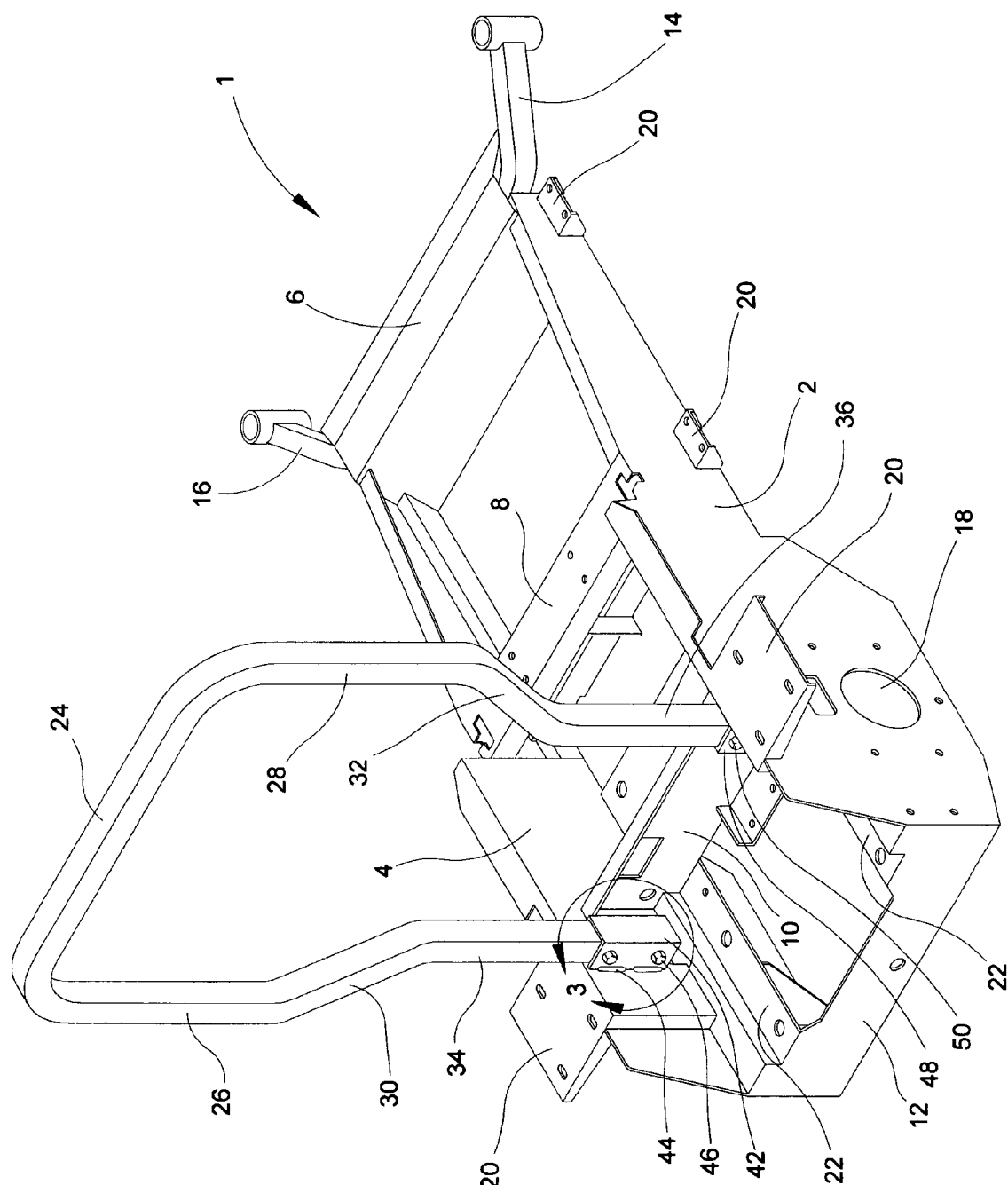
FIG. 1 is an isometric view of a preferred embodiment of the instant inventive ride-on turf mowing machine rollover protection assembly.

Referring now to the drawings, and in particular to FIG. 1, the instant inventive ride-on turf mowing machine rollover protection assembly is referred to generally by Reference Arrow 1. The rollover protection assembly 1 preferably comprises a chassis, preferably consisting of a rigid weldment including paired longitudinally extending main rails 2 and 4 which are interconnected by cross rails 6, 8, 10, and 12, the main and cross rails combination forming a rigid ladder frame weldment. The depicted chassis includes front wheel caster mounts 14 and 16, rear wheel axle apertures 18, body frame mounting brackets 20, and includes motor mounts 22.

Figure 2:
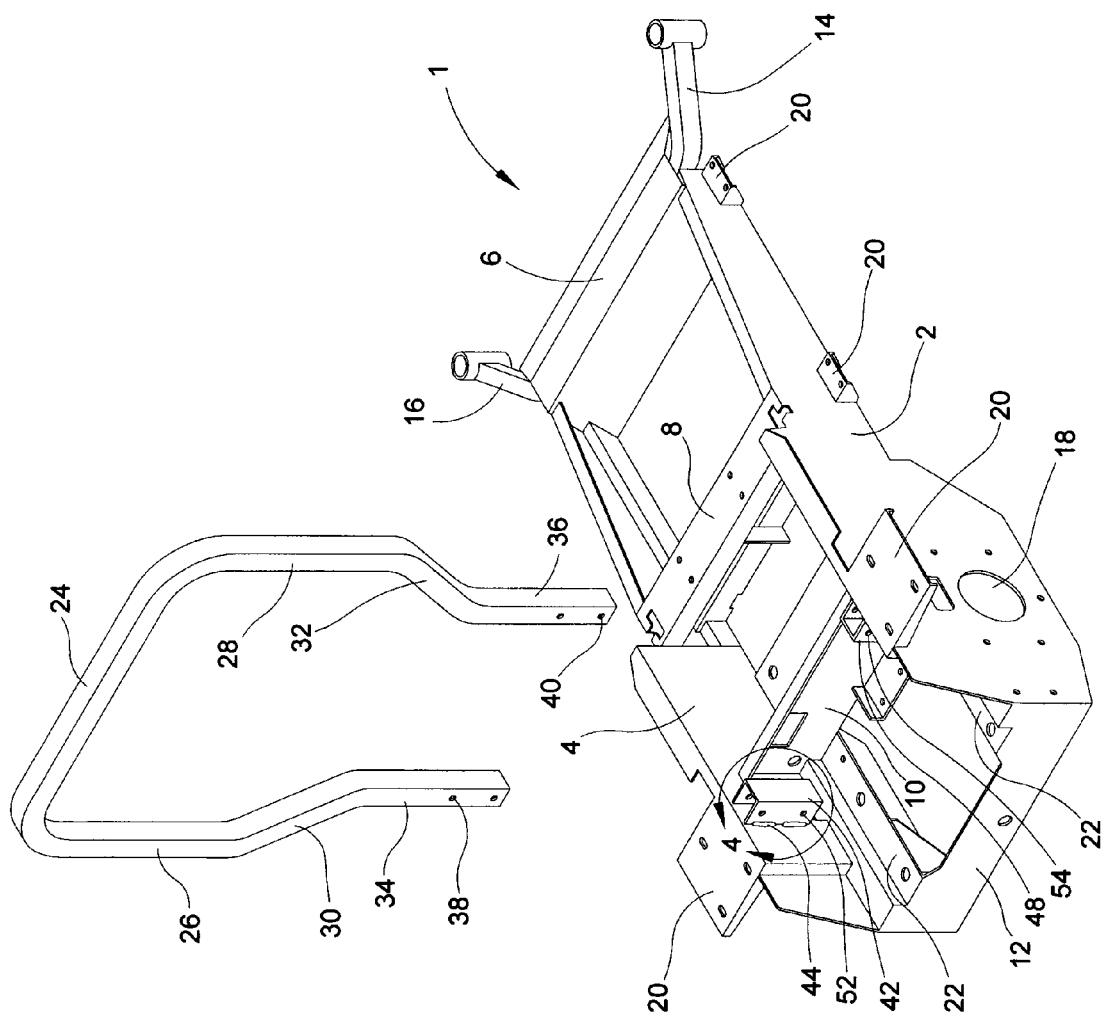
FIG. 2 is a partially exploded view of the assembly of FIG. 1.

Referring simultaneously to FIGS. 1 and 2, the assembly 1 further comprises a square or rectangular tubing roll bar, preferably consisting of a horizontally extending header 24, the left and right ends of the header 24 being formed wholly with downwardly extending legs 26 and 28. For facilitating the exaggerated width of header 24, legs 26 and 28 preferably include inwardly canted sections 30 and 32, the lower ends 34 and 36 of legs 26 and 28 preferably returning to their substantially vertical orientation for chassis engagement. Bolt or shear pin receiving eyes 38 and 40 preferably extend longitudinally and horizontally through the lower ends 34 and 36 of legs 26 and 28.

Figure 3:
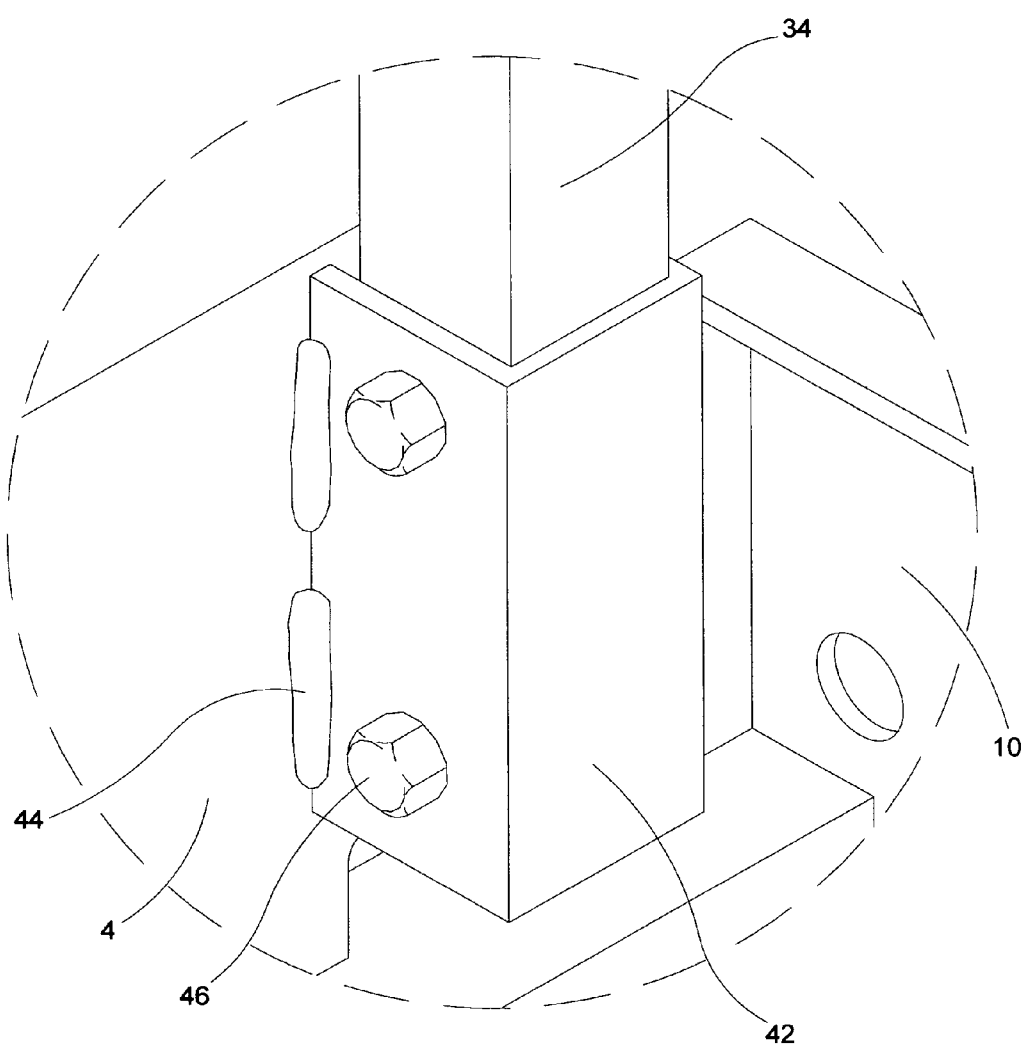
FIG. 3 is a magnified partial view as indicated in FIG. 1.
Figure 4:
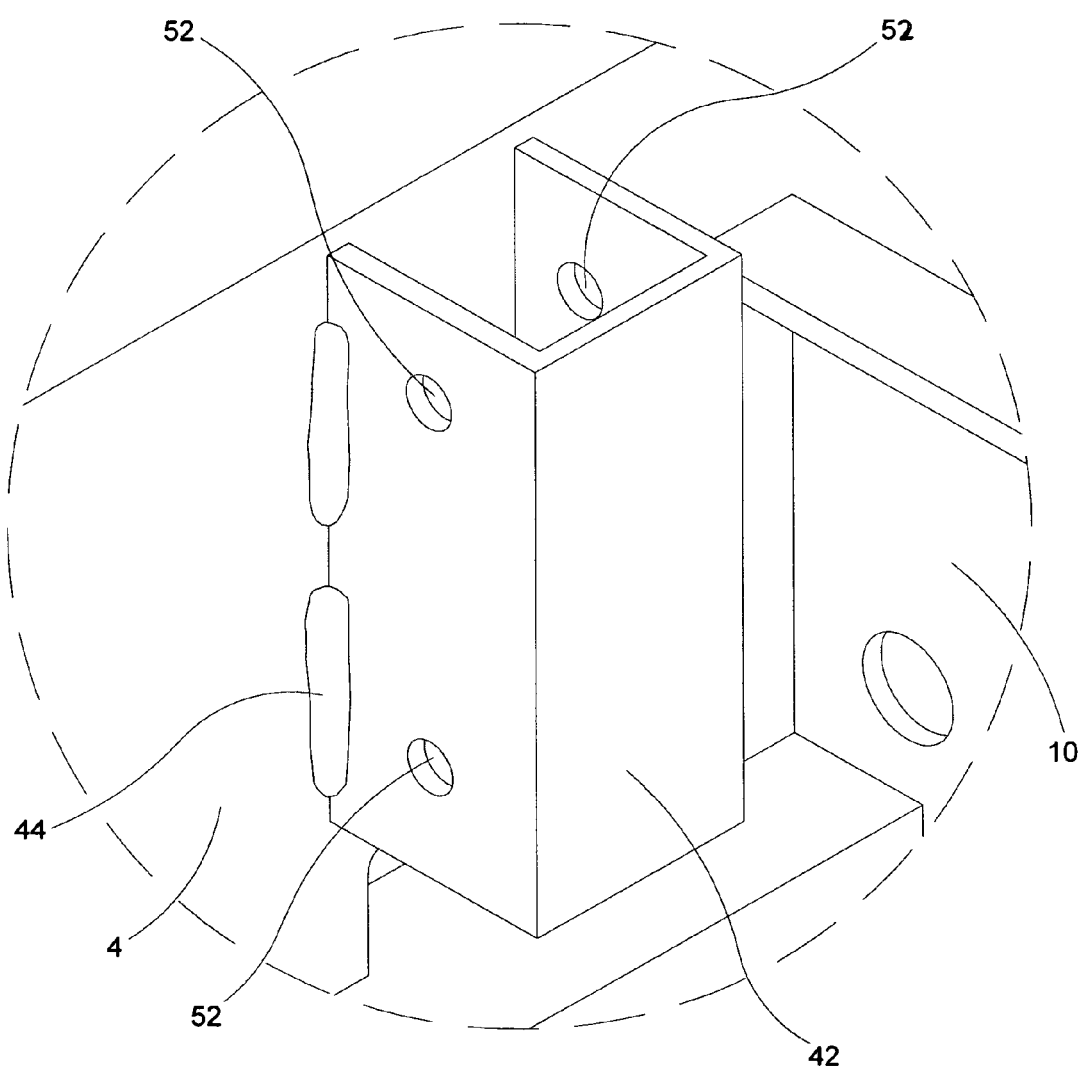
FIG. 4 is a magnified partial view as indicated in FIG. 2.

Referring simultaneously to FIGS. 2 and 4, a leftwardly or outwardly opening "C" channel beam 42 is preferably fixedly attached to the inner surface of the left main chassis rail 4 by welds 44. Such welded attachment advantageously utilizes the inner surface of rail 4 both for structural support and for closing the outward opening of "C" channel beam 42, allowing the main rail 4 in combination with "C" channel 42 to form and define a left upwardly opening quill. Preferably, the "C" channel beam 42 includes eyes 52 which, referring simultaneously to FIGS. 1 and 3, upon downward extension of the lower end 34 of leg 26 into the channel of "C" channel beam 42, may align with eyes 38. "C" channel beam 48, having eyes 54, mirrors "C" channel beam 42, such beam 48 oppositely opening rightwardly and outwardly and being attached, preferably by welding, to the right main rail 2. Like the left side, eyes 52 and 38, eyes 54 are preferably alignable with eyes 40 upon downward extension of the lower end 36 of leg 28 into the channel formed by "C" channel beam 48.

Referring simultaneously to all figures, bolts or shear pins 46 and 50 respectively extend laterally and horizontally through eyes 52 and 54. Where bolts are utilized, protruding ends are preferable secured by matching helically threaded nuts (not within view). Alternately, where shear pins are utilized, protruding ends of the shear pins are preferably secured by cotter pins, locked keys, pressure rings, and the like (not within view).

Referring further simultaneously to all figures, in operation of the instant inventive turf mowing machine rollover protection assembly, rollover impacts and twisting forces which may be directed against, for example, the header 24 and legs 26 and 28 are transmitted via bolts 44 and 50 and via direct contact against channel walls to the left and right quills 42 and 48. Substantially simultaneously, such forces are transmitted to the main chassis rails 4 and 2. Such rigid mechanical linkages securely position and continuously perpendicularly extend the roll bar for protection of an operator against head and neck injuries during a rollover.

In the event removal of the roll bar is desired; for example, for purposes of compact storage or shipment of the completed ride-on mowing machine, bolts or shear pins 46 and 50 may, with mechanical simplicity, be extracted, freeing the roll bar for removal. Reversal of such steps easily and conveniently remounts and attaches the roll bar.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

The invention claimed is:

1. A ride-on turf mowing machine rollover protection assembly comprising:
   (a) a mower chassis having left and right main rails, and having a plurality of cross rails spanning between the left and right main rails;
   (b) left and right upwardly opening quills;
   (c) left quill attaching means rigidly and abuttingly interconnecting the left main rail and the left upwardly opening quill;
   (d) right quill attaching means rigidly and abuttingly interconnecting the right main rail and the right upwardly opening quill;

(e) a roll bar having downwardly extending left and right legs, lower ends of the left and right legs being respectively closely fitted for extension into the left and right upwardly opening quills;

(f) roll bar attaching means removably mounting the left and right legs' lower ends respectively within the left and right upwardly opening quills; the left and right quill attaching means further respectively rigidly interconnecting the left and right upwardly opening quills and the chassis' left and right main rails; and (g) said left and right main rails having inner surfaces and said left and right upwardly opening quills having C channel configurations opening outwardly and being closed by said left and right main rail inner surfaces respectively; wherein said left and right quill attaching means comprises welding said left and right quills to the left and right main rail inner surfaces respectively.

2. The ride-on turf mowing machine rollover protection assembly of claim 1 wherein the left and right quill attaching means comprise fasteners selected from the group consisting of welds, helically threaded bolt, nut and apertured mounting flange combinations, rivet and apertured mounting flange combinations, clamp brackets, and wholly formed joints.

3. The ride-on turf mowing machine rollover protection assembly of claim 2 wherein the roll bar attaching means comprises a fastener selected from the group consisting of helically threaded bolt, nut, and double shear eye combinations, helically threaded screws and eye combinations, shear pin and double shear eye combinations, spring biased lug and eye combinations, channel and lock collar combinations, and helically threaded feet.

4. The ride-on turf mowing machine rollover protection assembly of claim 1 wherein the lower ends of the roll bar's left and right legs and the left and right upwardly opening quills have rectangular horizontal cross-sectional profiles.

5. The ride-on turf mowing machine rollover protection assembly of claim 1 wherein the quill attaching means further comprises a plurality of gusset plates further interconnecting the left and right upwardly opening quills and the mower chassis.

6. The ride-on turf mowing machine rollover protection assembly of claim 1 wherein each of the roll bar's left and right legs are canted inwardly.

* * * * *